(12) United States Patent
Lovell

(10) Patent No.: US 10,006,782 B2
(45) Date of Patent: Jun. 26, 2018

(54) CHARACTERIZATION OF SENSOR DATA FOR VEHICLE TELEMATICS

(71) Applicant: MOJ.IO INC., Vancouver (CA)

(72) Inventor: Robb E. Lovell, Vancouver (CA)

(73) Assignee: Moj.io Inc., Vancouver (CA)

( * ) Notice: Subject to any disclaimer, the term of this patent is extended or adjusted under 35 U.S.C. 154(b) by 897 days.

(21) Appl. No.: 14/539,799

(22) Filed: Nov. 12, 2014

(65) Prior Publication Data

US 2016/0132618 A1    May 12, 2016

(51) Int. Cl.
  *G01D 3/00*   (2006.01)
  *G01C 21/26*  (2006.01)
  *G06F 11/30*  (2006.01)

(52) U.S. Cl.
  CPC ............... *G01D 3/00* (2013.01); *G01C 21/26* (2013.01)

(58) Field of Classification Search
  CPC .......... G01D 3/00; G01C 21/26; G07C 5/085; B60W 2540/00; B60W 40/09
  USPC .......................... 701/31.4, 33.4, 36; 340/901
  See application file for complete search history.

(56) References Cited

U.S. PATENT DOCUMENTS

| | | | | |
|---|---|---|---|---|
| 2004/0054918 A1* | 3/2004 | Duri | ..................... | G06Q 20/382 726/1 |
| 2007/0156311 A1 | 7/2007 | Elcock et al. | | |
| 2010/0088123 A1* | 4/2010 | McCall | .................. | G06Q 40/08 705/4 |
| 2010/0210254 A1 | 8/2010 | Kelly et al. | | |
| 2011/0153367 A1 | 6/2011 | Amigo et al. | | |
| 2011/0229644 A1 | 9/2011 | Rajala et al. | | |
| 2012/0079149 A1 | 3/2012 | Gelvin et al. | | |
| 2012/0101855 A1 | 4/2012 | Collins et al. | | |
| 2013/0024060 A1 | 1/2013 | Sukkarie et al. | | |
| 2013/0065512 A1* | 3/2013 | Gunnarsson | ........... | H04B 7/155 455/7 |
| 2013/0246135 A1* | 9/2013 | Wang | ..................... | G07C 5/008 705/14.4 |
| 2014/0099607 A1* | 4/2014 | Armitage | ............... | B60W 40/09 434/66 |
| 2016/0086391 A1* | 3/2016 | Ricci | ..................... | G07C 5/008 701/29.3 |

(Continued)

*Primary Examiner* — Gertrude Arthur Jeanglaud
(74) *Attorney, Agent, or Firm* — Alleman Hall Creasman & Tuttle LLP

(57) ABSTRACT

A computing system located on-board a vehicle processes the input sensor data to obtain a downsampled representation of one or more time-series measurements. The computing system further identifies one or more characterization parameters to be reported as supplemental information along with the downsampled representation. The computing system processes the input sensor data to obtain a characterization value for each characterization parameter identified based on measurement conditions and communicates the characterizations based on a timing profile. The computing system formats the one or more characterization values to be reported along with the downsampled representation into one or more report messages. The computing system transmits the one or more report messages over a wireless wide area network directed to a server system. The one or more characterization values may be used by the server system as supplemental information in reconstructing the input sensor data from the downsampled representation.

20 Claims, 5 Drawing Sheets

(56) References Cited

U.S. PATENT DOCUMENTS

2016/0203652 A1* 7/2016 Throop ................ G07C 5/008
                                                        701/36

* cited by examiner

CHARACTERIZATION OF SENSOR DATA FOR VEHICLE TELEMATICS

BACKGROUND

Many modern vehicles include on-board electronic control systems that manage, measure, and report operation of the vehicle's various subsystems. On-board electronic control systems may include or otherwise support on-board diagnostic (OBD) services that enable vehicle owners and repair technicians to access diagnostic information or other forms of operational information from the control system. As one example, on-board electronic control systems may be accessed via a data interface in the form of a physical wired data link connector or data port, such as ALDL, OBD-I, OBD-1.5, OBD-II, or other suitable data interface.

SUMMARY

A computing system located on-board a vehicle receives input sensor data representing time-series measurements output by sensors located on-board the vehicle. The on-board computing system classifies the time-series measurements into supported measurement types. The on-board computing system processes the input sensor data to obtain a downsampled representation of the time-series measurements. A sampling rate of the downsampled representation may be identified or selected based on the classified measurement type.

The on-board computing system further identifies or selects characterization parameters to be reported as supplemental information along with the downsampled representation. Characterization parameters may be identified or selected based on measurement type and/or sampling rate of the downsampled representation. The on-board computing system processes the input sensor data to obtain a characterization value for each characterization parameter identified or selected.

The on-board computing system formats the one or more characterization values to be reported along with the downsampled representation into one or more report messages. Characterizations may be reported according to a timing profile. The on-board computing system transmits the report messages over a wireless wide area network directed to a server system. The characterization values may be used by the server system as supplemental information in reconstructing the input sensor data from the downsampled representation. As an example, the server system generates one or more qualitative linguistic terms based on the downsampled representation and/or the characterization values. These qualitative linguistic terms may be reported to users via an application program as part of a service hosted at the server system.

This summary includes only some of the concepts disclosed in greater detail by the following detailed description and associated drawings. As such, claimed subject matter is not limited to the contents of this summary.

DETAILED DESCRIPTION

Figure 1:
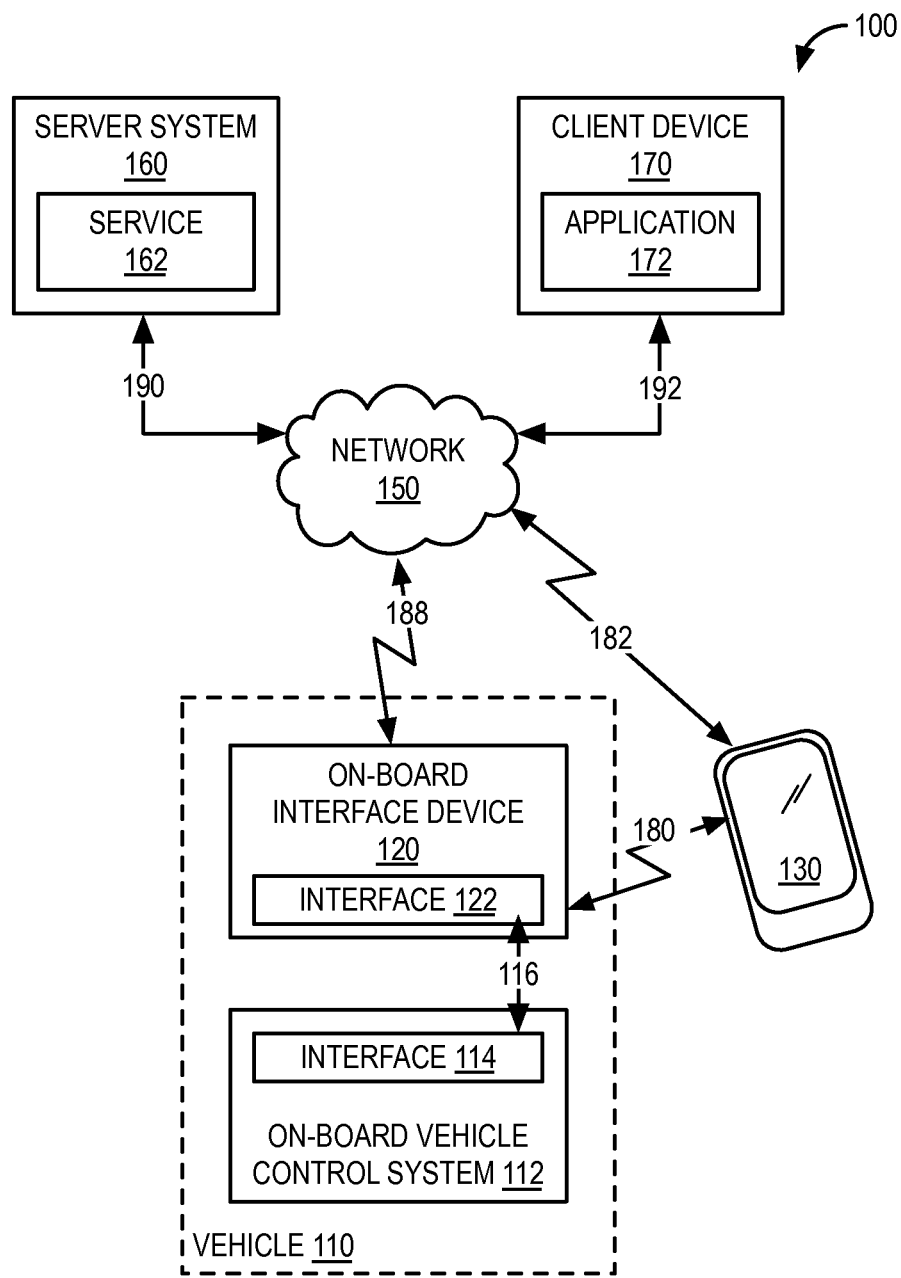
FIG. 1 is a schematic diagram depicting an example computing environment.

Telematics devices located on-board vehicles address the problem of converting many real-time, high frequency signals into a lower resolution representation. This may be achieved in a variety of ways, with each technique providing a different view of what is happening with a particular signal. Lower resolution representations of measurements may be particularly useful in contexts in which on-board measurements are communicated by the telematics device to a remote location over a network having a limited data rate, such as a wireless network, for example. The present disclosure introduces "characterizations" as a technique for providing supplemental information regarding a downsampled representation of a measurement in a manner that can be interpreted by remote off-board services and applications consistently and effectively.

As described herein a "characterization" includes a parameter or data element having an associated value that describes an aspect of another measurement, such as a time-series measurement that is downsampled to a lower resolution representation, for example. A non-limiting example of a characterization parameter is a measured maximum of a time-series measurement that has a corresponding value. In the context of a downsampled representation of the time-series measurement, the maximum value may not be present within the downsampled representation. Hence, the maximum value may be of use as supplemental information to better understand and reconstruct the time-series measurement.

In an aspect of the present disclosure, a computing system located on-board a vehicle receives input sensor data representing time-series measurements output by sensors located on-board the vehicle. The on-board computing system classifies the time-series measurements into supported measurement types. The on-board computing system processes the input sensor data to obtain a downsampled representation of the time-series measurements. A sampling rate of the downsampled representation may be identified or selected based on the classified measurement type.

The on-board computing system further identifies or selects characterization parameters to be reported as supplemental information along with the downsampled representation. Characterization parameters may be identified or selected based on measurement type and/or sampling rate of the downsampled representation. The on-board computing system processes the input sensor data to obtain a characterization value for each characterization parameter identified or selected.

The on-board computing system formats the one or more characterization values to be reported along with the downsampled representation into one or more report messages. The on-board computing system transmits the report messages over a wireless wide area network directed to a server system. The characterization values may be used by the server system as supplemental information in reconstructing the input sensor data from the downsampled representation.

As an example, the server system generates one or more qualitative linguistic terms based on the downsampled representation and/or the characterization values. These qualitative linguistic terms may be reported to users via an application program as part of a service hosted at the server system.

FIG. 1 is a schematic diagram depicting an example computing environment 100. Within computing environment 100, a vehicle 110 includes an on-board vehicle control system 112 that measures, manages, records, and reports operation of the vehicle's various subsystems. Vehicle 110 may take the form of a passenger vehicle, a work vehicle, or other suitable vehicle type. For example, vehicle 110 may take the form of a land-based wheeled, rail, or track vehicle (e.g., car, truck, bus, tractor, train, locomotive, motorcycle, snowmobile, etc.), an aircraft (e.g., airplane, helicopter, etc.), a marine vessel (e.g., boat or personal watercraft), or other suitable vehicle type.

Vehicle 110 further includes an on-board interface device 120. In one implementation, on-board interface device 120 may take the form of an aftermarket computing device that is installed by a vehicle owner, operator, or technician after purchase of the vehicle or at the time of purchase of the vehicle. As an example, the on-board interface device 120 may take the form of a telematics control unit (TCU). In another implementation, on-board interface device 120 may form part of and/or be integrated with on-board vehicle control system 112.

On-board interface device 120 and on-board vehicle control system 112 may collectively form an on-board computing system. On-board interface device 120 includes a data interface 122 for communicating with on-board vehicle control system 112 or portions thereof via a data interface 114 of control system 112. Such communications, indicated schematically by communication flow 116, may be bidirectional between on-board interface device 120 and vehicle control system 112, or may be unidirectional from on-board vehicle control system 112 to on-board interface device 120.

As an example, data interface 114 of on-board vehicle control system 112 may take the form of a physical hardware data link connector or data port, such as ALDL, OBD-I, OBD-1.5, OBD-II, or other suitable data interface. Data interface 122 of on-board interface device 120 may take the form of a physical hardware data link connector or data port that corresponds to and mates with interface 114. On-board interface device 120 may be physically added to and/or removed from interfacing with on-board vehicle control system 112 at the boundary of data interfaces 114 and 122. In another implementation, communication flow 116 may take the form of a wireless communications link between data interface 114 and data interface 122. In this implementation, the data interfaces may include wireless transceivers and associated electronic components supporting one or more wireless communications protocols, such as Bluetooth, Wi-Fi, NFC, etc.

While the disclosed subject matter is described in the context of vehicle-based implementations, it will be understood that some or all aspects of the disclosed subject matter may be used outside of a vehicle context, such as within other forms of connected devices, including buildings or building systems, electronic appliances, or objects to be tracked, for example. Within the context of a connected house, for example, measurements of temperature, humidity, which lights or appliances are on or off, an alarm system state, etc. may be obtained by an on-premises computing system from a sensor system, and reported off-premises to another computing device or system. In the context of an electronic appliance such as a blender or washing machine, for example, a computing system integrated with the appliance with or in communication with the appliance may obtain from a sensor system and report measurements of operational state of the appliance, such as time-based measurements of blender blade or washer unit speed or usage. In the context of objects to be tracked such as luggage or a package, for example, a computing system located on-board the luggage or package or communicating with sensors located on-board the luggage or package may obtain and report measurements of geographic location, altitude, temperature, etc. Accordingly, reference made to vehicle-based implementations are to be considered non-limiting, as the computing systems disclosed herein may obtain and report measurements obtained from sensor systems used to measure a state of virtually any object or environment.

On-board interface device 120 may communicate wirelessly with a variety of other computing devices or computing systems. For example, FIG. 1 depicts example wireless communications between on-board interface device 120 and mobile computing device 130 indicated by communication flow 180, and various other computing devices or computing system connected to communications network 150 as indicated by communication flow 188.

Wireless communications may be transmitted or received via a wireless wide area network using cellular or other suitable communication protocols, such as 3G UMTS protocols as defined by the 3GPP standards body, 4G LTE protocols as defined by the 3GPP standards body, or other suitable wireless communication protocols. Wireless communications may include or utilize additional protocols at sub-layers of a protocol stack, including SMS, HTTP, TCP, UDP, etc. As an example, communication flows 188 and 182 depicted in FIG. 1 in association with communications network 150 may be transmitted and received via a wireless wide area network (WAN) component of network 150. Communication flow 180 may include a wireless personal area network (PAN) and/or wireless local area network (LAN) using a different wireless protocol, such as Bluetooth, Wi-Fi, NFC, etc. Communication network 150 may include or take the form of one or more wired and/or wireless communication networks. Network 150 may include one or more wide area networks such as the Internet, cellular backhaul networks, telephone networks, intermediate network devices, and edge devices such as wireless and/or wired access points, etc.

A mobile computing device, such as device 130 may include or take the form of a wireless enabled portable electronic device (referred to as wireless device) such as a smartphone, a tablet computer, a notebook or laptop computer, a wearable computing device in the form of glasses or a wristwatch, etc. A service-enabled mobile computing device may refer to a general-purpose mobile computing device on which an application program operates that is paired with or specifically configured for use with one or more of on-board interface device 120, network service 162 hosted by server system 160, and/or application 172 hosted or otherwise operating at client device 170.

Computing environment 100 of FIG. 1 further includes server system 160 that hosts network service 162. Server system 160 may include one or more server devices that are co-located and/or geographically distributed. Service 162 may take the form of a web service that is accessible over at least an Internet protocol portion of communications network 150. Service 162 may support a programming interface, such as an API through which other computing devices and/or software modules of computing environment 100 may obtain information, post information, access information, and/or communicate with service 162. FIG. 1 depicts an example communication flow 190 between server system 160 and communications network 150.

Computing environment 100 of FIG. 1 may include additional computing devices, such as example client device 170 that may take the form of a personal computing device (i.e., a user client device) operated by a user, or alternatively a server system or server device that operates as a client in at least some contexts. FIG. 1 depicts an example communication flow 192 between client device 170 and communications network 150. Client device 170 may include an application program 172 that interacts with service 162, on-board interface device 120, and/or an application program of mobile device 130. As an example, application program 172 may take the form of a third-party network service or third-party client application program.

In at least some implementations, on-board interface device 120 may include one or more integrated sensors to obtain measurements in addition to or as an alternative to measurements obtained by on-board vehicle control system 112. As an example, on-board interface device 120 may include one or more motion sensors for detecting and/or measuring motion and/or vibration, one or more auditory sensors for detecting and/or measuring sound and/or vibration, a geo-position sensor system for measuring geo-position, among other suitable sensors. On-board interface device 120 may additionally obtain measurements from one or more sensors associated with or forming part of on-board vehicle control system 112 via communications link 116.

Figure 2A:
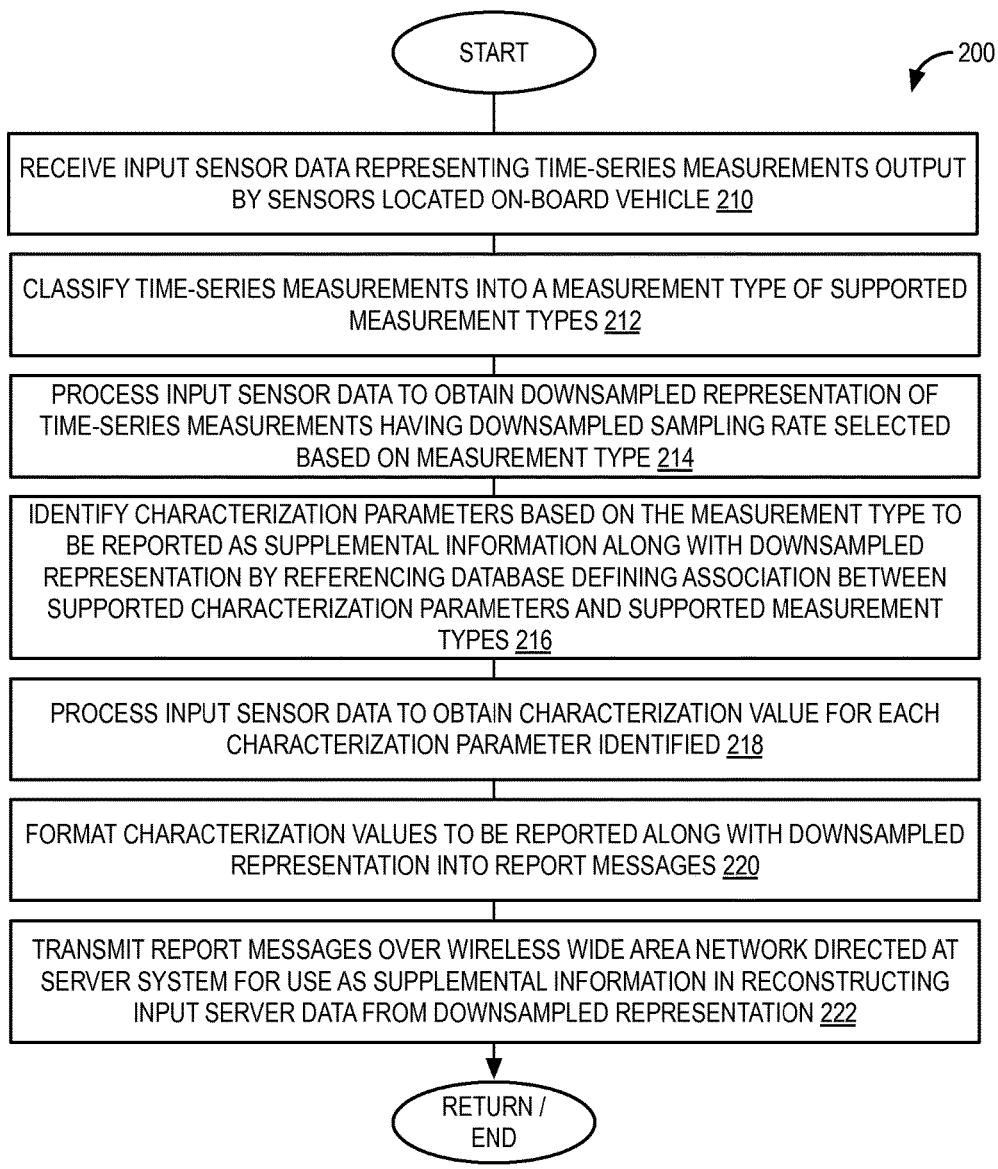
FIG. 2A is a flow diagram depicting an example method that may be performed by a computing system located on-board a vehicle.

FIG. 2A is a flow diagram depicting an example method 200. In an example, method 200 is performed by a computing system located on-board a vehicle (i.e., an on-board computing system). The on-board computing system may include an on-board interface device such as device 120 of FIG. 1 (e.g., a TCU device), an on-board vehicle control system such as system 112 of FIG. 1, or a combination of an on-board interface device and an on-board vehicle control system.

At 210, the method includes receiving input sensor data representing one or more time-series measurements output by one or more sensors located on-board a vehicle. The one or more sensors may form part of the on-board computing system (e.g., sensors forming part of the on-board vehicle control system and/or the on-board interface device). Additionally or alternatively the one or more sensors may form separate independent sensor devices from the on-board computing system (e.g., a passenger's mobile device, such as device 130 in FIG. 1), and may be communicatively coupled with the on-board computing system via wired and/or wireless communications links. In an example, a TCU device may receive some or all of the time-series measurements via the on-board vehicle control system as example communication flow 116 in FIG. 1. A TCU device may additionally or alternatively receive some or all of the time-series measurements via sensors integrated with the TCU device and/or from separate independent sensor devices communicating with the TCU device.

Non-limiting examples of time-series measurements output by sensors located on-board the vehicle include: (1) vehicle position (e.g., geo-position), (2) vehicle heading, (3) vehicle speed, (4) vehicle acceleration, (5) engine or motor rpm, (6) driving brake state, (7) parking brake state, (8) transmission state (e.g., current gear, park, reverse, neutral, etc.), (9) battery charge state, (10) ambient environmental conditions (e.g., temperature, humidity, pressure, etc.), (11) accelerator pedal position, and/or (12) fuel level, among other suitable time-series measurements. It will be understood that different and/or additional measurement types may be supported, depending on implementation, as the above list is to be considered non-limiting.

At 212, the method includes classifying the one or more time-series measurements into a measurement type of a plurality of supported measurement types. A measurement type may include one, two, three or more time-series measurements obtained from respective one, two, three or more sensors located on-board the vehicle. As one example, a vehicle velocity measurement type may include a time-series measurement of vehicle speed and a time-series measurement of vehicle heading. As another example, a vehicle speed measurement type may include a time-series measurement of transmission state and a time-series measurement of engine rpm.

The method at 212 may be performed for each measurement type or a subset of measurement types classified from the set of time-series measurements contained in the sensor data received from the sensors. Sensor data may include a plurality of different measurement types depending on implementation. Therefore, in at least some implementations, classifying time-series measurements into a measurement type may further include classifying two or more time-series measurements output from two or more sensor devices into a common measurement type. However, in other examples, an individual time-series measurement (e.g., a magnitude or value representing a measure temperature) may be classified into an individual measurement type (e.g., temperature). Further, the method at 212 may include classifying time-series measurements into a plurality of measurement types, including two, three, or more measurement types, depending on implementation, with each measurement type having one, two, three, or more time-series measurements.

In an example, two or more time-series measurements of a measurement type may be processed on-board the vehicle, in at least some implementations, by the on-board computing system to obtain a combined time-series measurement for that measurement type. This on-board processing of time-series measurements may serve to reduce an amount of information communicated over a wireless communication network or to reduce an amount of information used to describe a particular state. For example, if vehicle speed is calculated from a combination of transmission gear state and engine rpm, the on-board computing system may calculate and report the vehicle speed based on these two measurements rather than transmitting both measurements over a wireless communications network.

At 214, the method includes processing the input sensor data to obtain a downsampled representation of the one or more time-series measurements. In cases where a measurement type includes two or more time-series measurements, the method at 214 may include processing the two or more time-series measurements output from the two or more sensor devices to obtain a combined time-series measurement for the measurement type. The downsampled representation may have a downsampled sampling rate that is selected or otherwise identified based on the measurement type classified at 212.

As an example, the on-board computing system may reference a database defining an association between a plurality of supported downsampled sampling rates and a plurality of supported measurement types. Each measurement type may have a corresponding downsampled sampling rate. Furthermore, some measurement types may not be downsampled, such as for time-series measurements that are reported at their native sampling rate or at their maximum sampling rate (e.g., as defined by analog to digital conversion that is used to obtain the time-series measurements output by the sensors).

Additionally or alternatively, the downsampled sampling rate may be selected or otherwise identified based on a data rate of the wireless communications network and/or further based on an amount of additional information that is to be communicated over that wireless communications network by the on-board computing system.

At 216, the method includes selecting or otherwise identifying one or more characterization parameters based on the measurement type to be reported as supplemental information along with the downsampled representation. In an example, one or more characterization parameters may be identified by referencing a database defining an association between a plurality of supported characterization parameters and the plurality of supported measurement types. Additionally or alternatively, characterization parameters may be selected or identified based on the sampling rate of the downsampled representation and/or the sampling rate of the one or more time-series measurements. The on-board computing system may reference a database defining an association between supported characterization parameters and supported sampling rates.

Non-limiting examples of characterization parameters for the one or more time-series measurements include: (1) an instantaneous measurement of the input sensor data, (2) a minimum measurement of the input sensor data, (3) a maximum measurement of the input sensor data, (4) an average measurement of the input sensor data, (5) a median measurement of the input sensor data, (6) a change measurement of the input sensor data from one or more prior measurements of input sensor data, (7) a quantity measurement of occurrences of the input sensor data satisfying a condition, (8) a duration measurement of the input sensor data satisfying a condition, (9) a quantity measurement of changes of the input sensor data between two or more states (e.g., as compared to previous time-series measurements), (10) an equation representation of the input sensor data, and/or (11) a native sampling rate of the input data, among other suitable characterization parameters. It will be understood that the above list of characterization parameters is to be considered non-limiting as other suitable characterization parameters may be supported or used, depending on implementation.

At 218, the method includes processing the input sensor data to obtain a characterization value or set of two or more values for each characterization parameter identified. As an example, a value (e.g., 60 mph) of the maximum vehicle speed within a time-series measurement (e.g., a time-series sample of 1 minute duration) of vehicle speed may be identified, and additionally a time measurement value (e.g., a time identifier or time stamp) of a time of occurrence of that maximum vehicle speed within the time-series measurement may be identified (e.g., the maximum vehicle speed occurring at 30 seconds within the 1 minute duration). The time measurement value may be associated with the value of the maximum vehicle speed to form a set of values for an individual characteristic parameter, or the maximum value and time-based value may form separate characteristic parameters having separate characteristic values for maximum speed and time measurements.

At 220, the method includes formatting the one or more characterization values to be reported along with the downsampled representation into one or more report messages. In an example, the downsampled representation is also formatted into the same one or more report messages with the characterization values. In another example, the downsampled representation is formatted into different report messages that are independent of the characterization values.

In at least some implementations, the method at 220 may further include formatting contextual information into the one or more report messages. Non-limiting examples of contextual information include: (1) an identifier of the vehicle (e.g., as a VIN), (2) an identifier of the computing system located on-board the device (e.g., as an International Mobile Station Equipment Identity), (3) an identifier of a corresponding time of the one or more characterization values, (4) an identifier of a corresponding time period of the one or more characterization values, (5) an identifier of the sampling rate of the downsampled representation, (6) an identifier of a sampling rate of the input sensor data, (7) an identifier of a corresponding time (e.g., date and time) of the downsampled representation and/or input sensor data, (8) an identifier of a corresponding time period of the downsampled representation and/or input sensor data, (9) an identifier of the measurement type classified from the input sensor data (e.g., as an operational code), (10) an identifier of a geographic location (e.g., in longitude and latitude) of the vehicle at a time that the input sensor data is received, a (11) a sequence identifier of the report message in a sequence of other report messages, and/or an identifier of each characterization parameter contained within the report message. It will be understood that other suitable forms of contextual information may be used, depending on implementation, as the above list is to be considered non-limiting.

Some or all of the above example of contextual information may be included in an individual report message, in any suitable combination. As a non-limiting example, a base level of contextual information may be included in each report message, including an identifier of the corresponding time of the one or more characterization value and/or time-series measurement(s) or their downsampled representations included in the report message, an identifier of a time period to which the report message is applicable to enable time-series measurements or their downsampled representations to be correlated with the report message, an identifier of the vehicle, an identifier of the on-board computing system, an identifier of a geographic location of the vehicle, an identifier of each characterization parameter included in the report message, and an identifier of measurement type of each time-series measurement or downsampled representation thereof.

At 222, the method includes transmitting the one or more report messages over a wireless wide area network directed to a server system. In an example, the one or more characterization values may be for use by the server system as supplemental information in reconstructing the input sensor data from the downsampled representation. The one or more report messages may be among a sequence of a plurality of report messages transmitted by the on-board computing system over time. This sequence of report messages may correspond to a sequence of time-series measurements output by the one or more sensors located on-board the vehicle over time.

Figure 3:
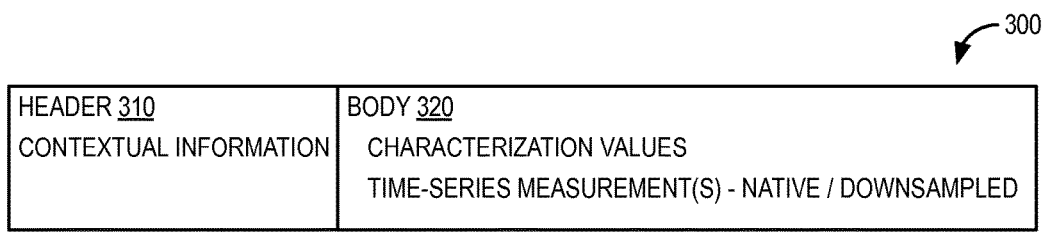
FIG. 3 is a schematic diagram depicting an example report message.

In at least some implementations, the one or more report messages form one or more data packets transmitted over the wireless wide area network. Referring also to FIG. 3, a non-limiting example of a report message 300 includes a header portion 310 and a body portion 320. In this example, header 310 includes contextual information, and body 320 includes characterization values for characterization parameters and/or time-series measurements in a native or downsampled form.

Formatting contextual information into a report message at operation 220 of method 200 may include inserting the contextual information into the header of the report message. Formatting one or more characterization values into a report message at 220 operation may include inserting the one or more characterization values into the body of one or more report messages, or alternatively into the header of the one or more report messages. The time-series measurements or downsampled representations thereof may be reported by formatting the time-series measurements or downsampled representations at operation 220 into the body of the one or more report messages. In an example, a time-series measurement or a downsampled representation thereof may take the form of an array of sample values within the body of the one or more report messages in which the array referenced within the header of the one or more report messages by contextual information or alternatively by characterization values.

The databases or portions thereof described with regards to method 200 may reside at the on-board computing system, and may be stored in a storage subsystem of the on-board computing system. Alternatively or additionally, the databases or portions thereof may reside at a remote computing system from the vehicle (e.g., server system 160 or a third-party server system), and may be stored in a storage subsystem of the remote computing system. In such case, the on-board computing system may transmit one or more requests to the remote computing system over the wireless WAN for database information referenced by the on-board computing system. The remote computing system may receive and process the requests by transmitting one or more responses to the on-board computing system. Alternatively, updates to an on-board database may be pushed to the on-board computing system. Responses may include the database information requested by the on-board computing system or pushed to the on-board computing system, and may be received and utilized by the on-board computing system in accordance with method 200.

In at least some implementations, a TCU device may be configured to obtain an identifier of the vehicle (e.g., VIN) with which the TCU device is installed, and use that identifier to reference an applicable portion of a database that pertains to the vehicle identifier or class of vehicle to which that vehicle belongs. The TCU device may send a request that contains the identifier of the vehicle to a service hosted at a remote server system and may receive the applicable portion of the database from the remote server system.

In at least some implementations, conditions may be used as triggers for determining when or if characterizations are to be reported as supplemental information. A condition may refer to an expression that is evaluated to determine a measurement's state, used in the creation and/or reporting of a characterization. In an example, method 200 may further include comparing each characterization value for each characterization parameter to a corresponding condition associated with that characterization parameter. Alternatively or additionally, conditions may be applied to raw/native time-series measurements received by the on-board computing system and/or to processed downsampled representations of those time-series measurements to determine if and when characterizations for those time-series measurements are to be reported. Upon satisfaction of the corresponding condition, the formatting of the one or more characterization values into report messages at 220 may be selectively performed for each characterization parameter upon satisfaction of the corresponding condition.

In an example, a condition may take the form of a timing profile that is evaluated against a characterization parameter and its corresponding characterization value obtained from its underlying time-series measurement or evaluated against the time-series measurement itself. A timing profile defines one or more state changes in one or more time-series measurements of a measurement type to be satisfied for a characterization value of an associated characterization parameter to be included in the one or more reporting messages. Non-limiting examples of state changes defined by a timing profile include one or more of a level (e.g., magnitude), a leading edge (e.g., of an increase or step-function increase), a trailing edge (e.g., of a decrease or a step-function decrease), a high level (e.g., a maximum), and/or a low level (e.g., a minimum) of one or more time-series measurements. However, other suitable conditions may be evaluated against any aspect of the time-series measurement or the previously described characterization parameters that may be associated with a time-series measurement.

As another example, a condition may define a sampling rate that must be satisfied for a particular measurement or downsampled representation for a characterization to be reported. Reporting of a characterization may be based on whether a sampling rate of a time-series measurement for a downsampled representation is greater than or less than a threshold sampling rate. As another example, reporting of a characterization may be based on whether the native sampling rate or raw data rate of the time-series measurement is greater than or less than a threshold rate. In these example, characterization parameters may not be reported if the downsampled sampling rate or native sampling rate of the measurement type to be reported exceeds a sampling rate condition, whereas the characterization parameter may be reported if the downsampled sampling rate or native sampling rate that does not exceed the sampling rate condition, or vice-versa.

If the corresponding condition for a particular characterization parameter is not satisfied, the formatting at 220 may not be performed for that characterization parameter. If the corresponding condition is satisfied, then the formatting at 220 may be performed. Hence, the report messages transmitted at 222 would not include the characterization values that did not satisfy their corresponding conditions and would include the characterization values that satisfied their corresponding conditions. Additionally, in some examples of this implementation, method 200 may further include identifying the corresponding condition for each characterization parameter and/or measurement type by referencing a database further defining an association between the plurality of supported characterization parameters and corresponding conditions, and/or an association between the plurality of supported measurement types and corresponding conditions.

Figure 2B:
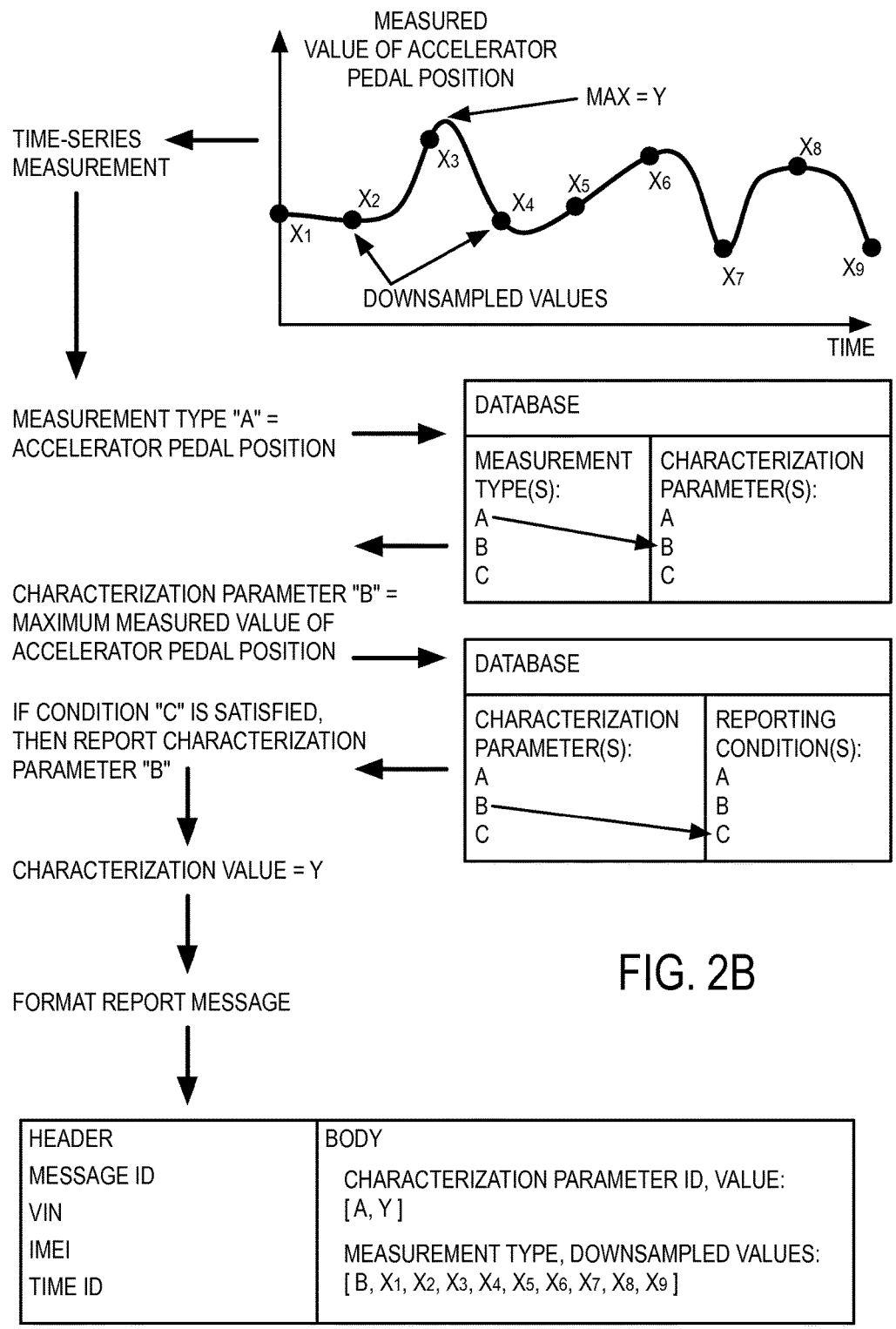
FIG. 2B is a schematic diagram depicting an example processing pipeline for the method of FIG. 2A.

FIG. 2B is a schematic diagram depicting an example processing pipeline for the method of FIG. 2A. Within FIG. 2B, an example time-series measurement takes the form of a measured value of accelerator pedal position over time. The time-series measurement is received and classified into a measurement type that is associated with a characterization parameter in a database. In this example, the characterization parameter takes the form of a maximum measured value of accelerator pedal position. The maximum value "Y" is depicted schematically within the time-series measurement in FIG. 2B. The database depicted in FIG. 2B includes a plurality of supported measurement types that are each associated with one or more of a plurality of supported characterization parameters. For example, the measurement type "A" is associated with a characterization parameter "B". The characterization parameter "B" is associated with a reporting condition "C" in a database (e.g., the same database or a different database of a common database system). Upon satisfaction of the reporting condition, a characterization value "Y" for the characterization parameter (e.g., the maximum value "Y" for pedal position) is formatted and reported as part of a report message. The report message further includes a downsampled representation of the time-series measurement. Example downsampled values (X1, X2, X3, etc.) of the downsampled representation are depicted schematically within the time-series measurement in FIG. 2B. In this example, the maximum value does not necessarily correspond to one of the downsampled values. Hence, the maximum value reported with the downsampled representation may be useful in understanding and reconstructing the original or native time-series measurement.

Figure 4:
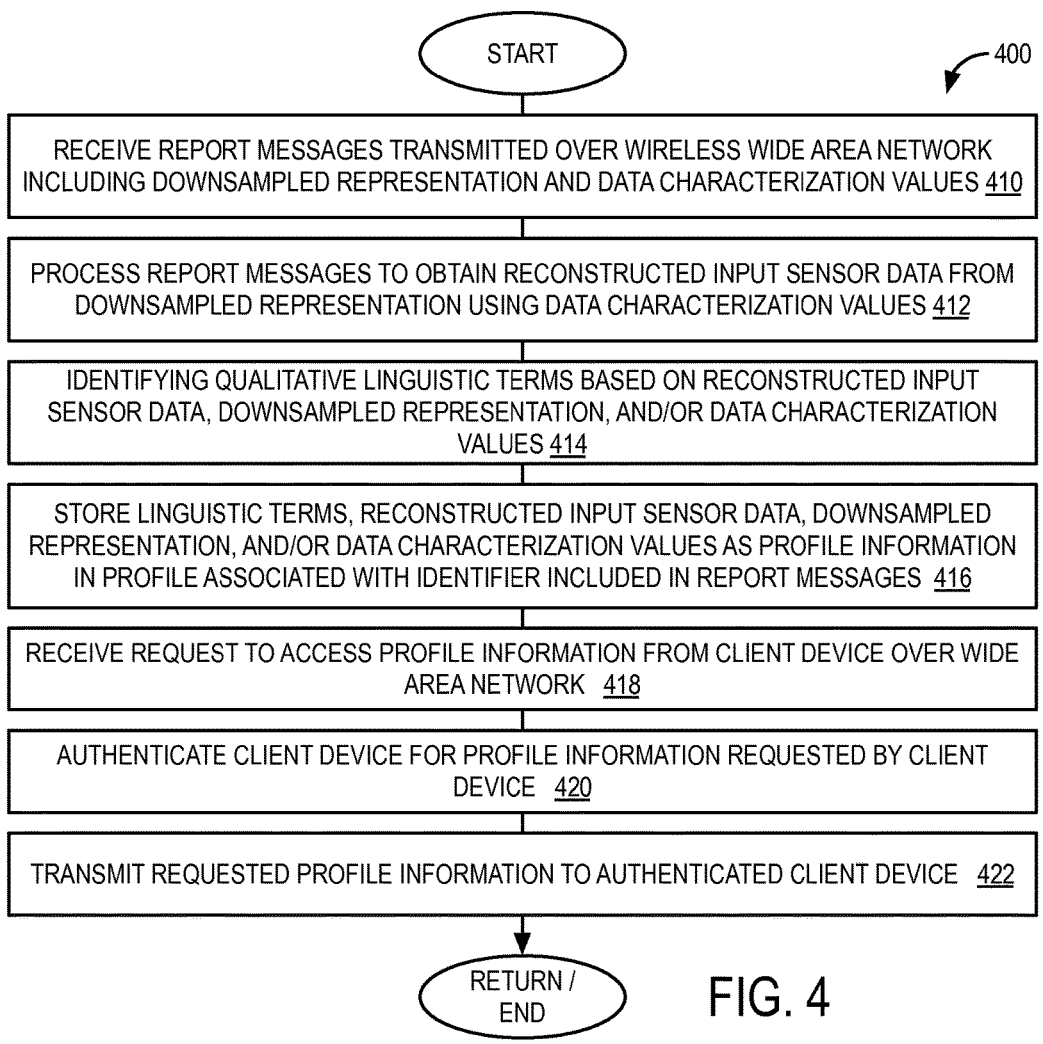
FIG. 4 is a flow diagram depicting an example method that may be performed by a server system.

FIG. 4 is a flow diagram depicting an example method 400. In an example, method 400 is performed by a server system, such as example service system 160 of FIG. 1. This server system may refer to the previously described sever system or remote computing system of method 200 of FIG. 2A, for example.

At 410, the method includes receiving one or more report messages transmitted over a wireless wide area network by a computing system located on-board a vehicle. The one or more report messages may include a downsampled representation of input sensor data that was output by one or more sensors located on-board the vehicle. The one or more report messages may further include one or more data characterization values obtained by the computing system located on-board the vehicle from the input sensor data. As previously described with reference to method 200, the one or more report messages may be among a sequence of a plurality of report messages transmitted by the on-board computing system over time. This sequence of report messages may correspond to a sequence of time-series measurements output by one or more sensors located on-board the vehicle over time. FIG. 3 depicts a non-limiting example of a reporting message. Accordingly, the reporting message received at 410 may include contextual information, characterization values, and/or time series measurements (e.g., native or downsampled) located within header and body portions of each message.

At 412, the method includes processing the one or more report messages to obtain reconstructed input sensor data based on the downsampled representation using the one or more data characterization values. In the context of method 400, reconstructing the input sensor data may include reconstructing a portion of the input sensor data using the downsampled representation as a base measurement and improving the base measurement with supplemental information in the form of the one or more characterization values that were reported for that downsampled representation. As an example, a downsampled representation may be improved with supplemental information in the form of minimum and maximum values that were not included in the downsampled representation to provide a better representation of the raw time-series measurement.

At 414, the method includes identifying one or more qualitative linguistic terms based on the reconstructed input sensor data by referencing a database of supported qualitative linguistic values having associated conditions to which the reconstructed input sensor data is compared.

Non-limiting examples of qualitative linguistic terms include: (1) Fast or Slow with reference to a speed measurement, (2) Harsh or Careful with reference to an acceleration measurement, (3) Wasteful or Efficient with reference to a mile-per-gallon or driving efficiency measurement, (4) Traveller or Homebody with reference to a location or range measurement, (5) Direct or Indirect with reference to a path measurement, (6) Thrifty or Wasteful with reference to a fuel level or usage measurement, (7) Healthy or Damaged with reference to an existence of a diagnostic code, (8) Maintainer or Survivor with reference to a duration of a diagnostic code, (9) Heavy or Light with reference to a time spent driving as compared to parked, (10) Regular or Irregular with reference to a variability in driving or frequency driving in a time domain, (11) Morning or Afternoon or Evening or Night with reference to a time when driving takes place, (12) Mover or Idler with reference to a time spent idling, (13) Loner or Grouper with reference to a time spent driving in traffic.

At 416, the method includes storing the one or more qualitative linguistic values and/or the reconstructed input sensor data as profile information in a profile associated with an identifier included in the one or more report messages. The identifier may include a vehicle identifier, an identifier of the on-board computing system, a user identifier, or other suitable identifiers. Additionally, the method at 416 may include storing the downsampled representation, native time-series measurements, and/or the one or more characterization values in the profile associated with the identifier included in the one or more report messages.

At 418, the method includes receiving a request to access the profile information from a client device over a wide area network. The client device may include a third-party server implementing a third-party service or alternatively a user client device operated by a user. In at least some implementations, the server system or the service hosted at the server system may provide an application programming interface (API) by which client devices may submit requests for profile information or post information to the server system. Information posted to the server system may include associations between measurement types, characterization parameters, and other data relationships within a database referenced by the server system hosting the service and/or by the computing systems located on-board vehicles to determine when and if characterizations are to be reported along with downsampled or raw time-series measurements.

At 420, the method includes authenticating the client device for the profile information requested by the client device. A client device may be authenticated for a session using a login credentials, token, or other suitable form of authentication. At 422, the method includes transmitting the profile information requested by the client device over the wide area network following authentication of the client device. The profile information may be presented to a user via the client device as an example.

Figure 5:
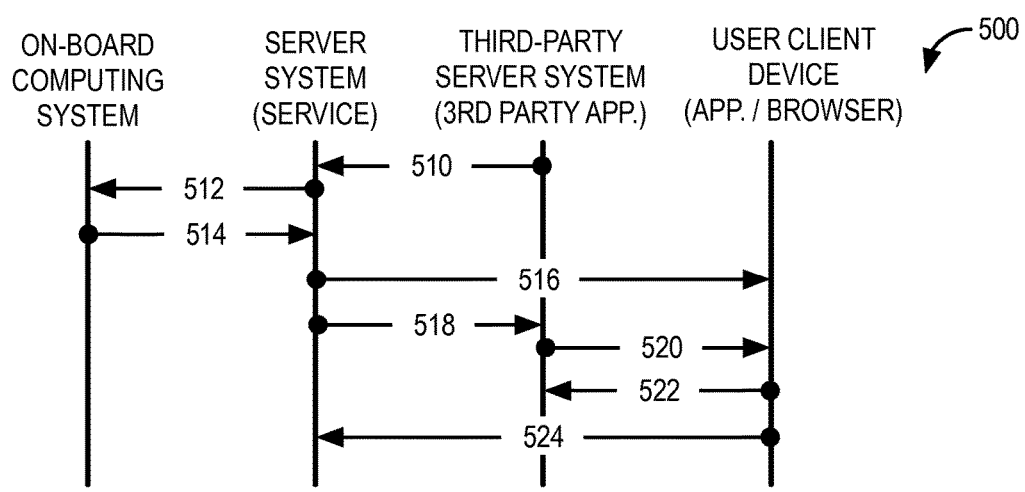
FIG. 5 is a flow diagram depicting an example interaction between several computing devices and computing systems within the context of the computing environment of FIG. 1.

FIG. 5 is a flow diagram depicting an example interaction 500 between several computing devices and computing systems within the context of computing environment 100 of FIG. 1. At 510, a third-party server system implementing a third-party application or service may communicate information defining relationships between characterizations, measurement types, and conditions as previously described with reference to the databases referenced by the on-board computing system in method 200. The server system may propagate these relationships to or otherwise define these relationships on behalf of on-board computing systems by communicating the relationship information as indicated at 512 as either a push or response message. The on-board computing system reports measurements and characterization information in accordance with these defined relationships between measurement type, characterizations, and conditions as previously described with reference to method 200. In an example, the on-board computing system communicates report messages at 514 to the server system implementing the service. As another example, the on-board computing system communicates report messages to the third-party server system without traversing the server system implementing the service. The report messages are processed and the resulting information may be accessed by the user client device via an application program or browser, either directly at 516 from the server system or via third-party server system at 518 and 520. For example, at 518, the resulting information may be obtained by the third-party server system via an API of the server system implementing the service. The third-party server system may further process the resulting information before making the processed information available to user client device at 520. The user client device may define a change to the relationship between measurement types, characterizations, and conditions, which may be implemented via communication with the third-party server system at 522 or with the server system hosting the service at 524. The process flow depicted in FIG. 5 may be repeated to propagate updates or changes to the database referenced by the on-board computing system.

Each on-board computing system, including a TCU device and/or an OBD device may be constrained by what data it is capable of extracting, how it extracts that data, and the reliability of that extraction. Capability information may determine what algorithms can be implemented by the particular TCU device. A capabilities record may be used by the servers system hosting the service to determine which algorithms may be run for the data coming from that device. The capabilities record may contain following information: a list of measures and the characterization fields sent and timing for each one, a list of commands with the range of values and frequency capabilities and timings for each one, configuration and firmware update capabilities, and communication strategy (e.g., UDP, TCP, SMS, API, etc.), and reliability scoring and sources for measures, reliability and accuracy of commands.

The above described methods and processes may be tied to a computing system including one or more computing devices. In particular, the methods and processes described herein may be implemented as one or more applications, service, application programming interfaces, computer libraries, and/or other suitable computer programs or instruction sets.

Figure 6:
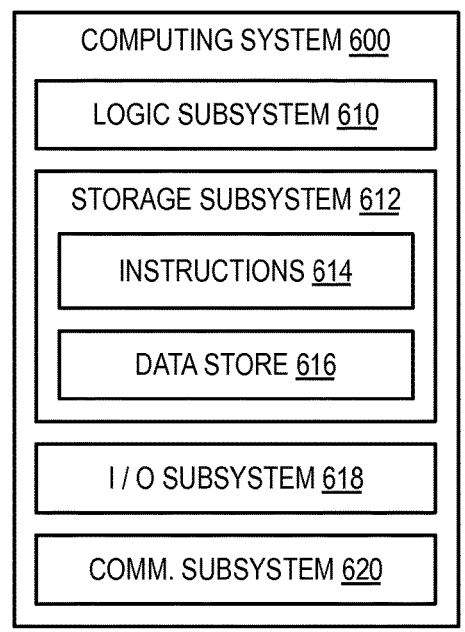
FIG. 6 is a schematic diagram depicting an example computing system.

FIG. 6 is a schematic diagram depicting an example computing system 600 that may perform one or more of the above described methods and processes. Computing system 600 is shown in simplified form. It is to be understood that virtually any computer architecture may be used without departing from the scope of this disclosure. Computing system 600 or portions thereof may take the form of one or more of a mainframe computer, a server computer or server system, a computing device or computing system located on-board a vehicle, a desktop computer, a laptop computer, a tablet computer, a home entertainment computer, a network computing device, a mobile computing device, a mobile communication device, a wearable computing device, etc.

Computing system 600 includes a logic subsystem 610 and an information storage subsystem 612. Computing system 600 may further include an input/output subsystem 618 and a communication subsystem 620. Logic subsystem 610 may include one or more tangible, physical devices configured to execute instructions, such as example instructions 614 held in storage subsystem 612. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more hardware processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 612 includes one or more tangible, physical, non-transitory, machines or hardware devices configured to hold data (e.g., one or more of the previously described databases) in data store 616 and/or instructions 614 executable by the logic subsystem to implement the herein described methods and processes. When such methods and processes are implemented, the state of storage subsystem 612 may be transformed (e.g., to hold different data or other suitable forms of information).

Storage subsystem 612 may include removable media and/or built-in devices. Storage subsystem 612 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 612 may include devices with one or more of the following characteristics: volatile, nonvolatile, dynamic, static, read/write, read-only, random access, sequential access, location addressable, file addressable, and content addressable. In at least some implementations, logic subsystem 610 and storage subsystem 612 may be integrated into one or more common devices, such as an application specific integrated circuit or a system on a chip.

It is to be appreciated that storage subsystem 612 includes one or more tangible, physical, non-transitory devices. In contrast, in at least some implementations and under select operating conditions, aspects of the instructions described herein may be propagated in a transitory fashion by a signal (e.g., an electromagnetic signal, an optical signal, etc.) that is not held by a physical device for at least a finite duration. Furthermore, data and/or other forms of information pertaining to the present disclosure may be propagated by a signal.

It is to be appreciated that a "service", as used herein, may be an application program or other suitable instruction set executable across multiple sessions and available to one or more system components, programs, and/or other services.

In at least some implementations, a service may run on a server or collection of servers responsive to a request from a client (e.g., an on-board computing device, a wireless mobile device, or other networked computing device).

Input/output subsystem 618 may include and/or otherwise interface with one or more input devices and/or output devices. Examples of input devices include a keyboard, keypad, touch-sensitive graphical display device, touch-panel, a computer mouse, a pointer device, a controller, an optical sensor, a motion and/or orientation sensor (e.g., an accelerometer, inertial sensor, gyroscope, tilt sensor, etc.), an auditory sensor, a microphone, or other suitable sensor devices, etc. Examples of output devices include a graphical display device, a touch-sensitive graphical display device, an audio speaker, a haptic feedback device (e.g., a vibration motor), etc. When included, a graphical display device may be used to present a visual representation of data held by storage subsystem 612. As the herein described methods and processes change the data held by the storage subsystem, and thus transform the state of the storage subsystem, the state of the graphical display may likewise be transformed to visually represent changes in the underlying data.

Communication subsystem 620 may be configured to communicatively couple computing system 600 with one or more other computing devices or computing systems. Communication subsystem 620 may include wired and/or wireless communication devices compatible with one or more different communication protocols. As an example, the communication subsystem may be configured for communication via a wireless telephone network, a wireless local area network, a wired local area network, a wireless personal area network, a wired personal area network, a wireless wide area network, a wired wide area network, etc. In at least some implementations, the communication subsystem may enable computing system 600 to send and/or receive messages to and/or from other devices via a communications network such as the Internet and/or cellular networks, for example.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof. It should be understood that the disclosed embodiments are illustrative and not restrictive. Variations to the disclosed embodiments that fall within the metes and bounds of the claims, now or later presented, or the equivalence of such metes and bounds are embraced by the claims.

The invention claimed is:

1. A method performed by a computing system located on-board a vehicle, the method comprising:
    receiving input sensor data representing one or more time-series measurements output by one or more sensors located on-board the vehicle;
    classifying the one or more time-series measurements into a measurement type of a plurality of supported measurement types;
    processing the input sensor data to obtain a downsampled representation of the one or more time-series measurements, the downsampled representation having a downsampled sampling rate selected based on the measurement type;
    identifying one or more characterization parameters based on the measurement type to be reported as supplemental information along with the downsampled representation by referencing a database defining an association between a plurality of supported characterization parameters and the plurality of supported measurement types;
    processing the input sensor data to obtain a characterization value for each characterization parameter identified;
    formatting the one or more characterization values to be reported along with the downsampled representation into one or more report messages; and
    transmitting the one or more report messages over a wireless wide area network directed to a server system, the one or more characterization values for use by the server system as supplemental information in reconstructing the input sensor data from the downsampled representation.

2. The method of claim 1, wherein the one or more characterization parameters include one or more of: (1) an instantaneous measurement of the input sensor data, (2) a minimum measurement of the input sensor data, (3) a maximum measurement of the input sensor data, (4) an average measurement of the input sensor data, (5) a median measurement of the input sensor data, (6) a change measurement of the input sensor data from one or more prior measurements of input sensor data, (7) a quantity measurement of occurrences of the input data satisfying a condition, (8) a duration measurement of the input data satisfying a condition, (9) a quantity measurement of changes of the input data between two or more states, (10) an equation representation of the input data, and/or (11) a native sampling rate of the input data.

3. The method of claim 1, wherein classifying the one or more time-series measurements into the measurement type includes classifying a single time-series measurement into the measurement type; and
    wherein the method further includes classifying one or more additional time-series measurements into an additional measurement type of the plurality of supported measurement types.

4. The method of claim 1, wherein classifying the one or more time-series measurements into the measurement type further includes classifying, into the measurement type, two or more time-series measurements of the input sensor data from two or more sensor devices.

5. The method of claim 4, further comprising:
    processing the two or more time-series measurements output from the two or more sensor devices to obtain a combined time-series measurement for the measurement type; and
    wherein processing the input sensor data to obtain the downsampled representation of the one or more time-series measurements further includes processing the combined time-series measurement to obtain the downsampled representation of the combined time-series measurement.

6. The method of claim 5, wherein processing the input sensor data to obtain the characterization value for each characterization parameter identified further includes processing the combined time-series measurement to obtain the characterization value for each characterization parameter identified.

7. The method of claim 5, wherein each of the two or more time-series measurements is associated with one or more corresponding characterization parameters such that a corresponding characterization value is obtained for each of the one or more corresponding characterization parameters.

8. The method of claim 1, further comprising:
comparing each characterization value for each characterization parameter to a corresponding condition associated with that characterization parameter; and
wherein formatting the one or more characterization values to be reported along with the downsampled representation into one or more report messages is selectively performed for each data characterization upon satisfaction of the corresponding condition.

9. The method of claim 8, further comprising:
identifying the corresponding condition for each data characterization parameter by referencing the database further defining an association between the plurality of supported characterization parameters and the corresponding condition.

10. The method of claim 1, wherein the computing system located on-board the vehicle includes a telematics control unit that communicates with a on-board vehicle control system of the vehicle via a wired or wireless communications link; and
wherein receiving the input sensor data further includes receiving the input sensor data from the on-board vehicle control system over the wired or wireless communications link.

11. The method of claim 1, further comprising:
formatting contextual information into the one or more report messages;
wherein the contextual information includes one or more of: (1) an identifier of the vehicle, (2) an identifier of the computing system located on-board the device, (3) an identifier of a corresponding time of the one or more characterization values, (4) an identifier of a corresponding time period of the one or more characterization values, (5) an identifier of the sampling rate of the downsampled representation, (6) an identifier of a sampling rate of the input sensor data, (7) an identifier of a corresponding time of the downsampled representation and/or input sensor data, (8) an identifier of a corresponding time period of the downsampled representation and/or input sensor data, (9) an identifier of the measurement type classified from the input sensor data; and/or (10) an identifier of a geographic location of the vehicle at a time that the input sensor data is received.

12. The method of claim 11, wherein formatting the contextual information into the one or more report messages includes inserting the contextual information into a header of the one or more report messages.

13. The method of claim 12, wherein each of the one or more report messages further include a body in addition to the header; and
wherein formatting the one or more characterization values into the one or more report messages further includes inserting the one or more characterization values into the body of the one or more report messages.

14. The method of claim 12, wherein formatting the one or more characterization values into the one or more report messages further includes inserting the one or more characterization values into the header of the one or more report messages.

15. The method of claim 12, wherein the downsampled representation is reported along with the downsampled representation by formatting the downsampled representation into a body of the one or more report messages.

16. The method of claim 15, wherein the downsampled representation forms an array of sample values within the body of the one or more report messages.

17. The method of claim 1, wherein the one or more report messages form one or more data packets transmitted over the wireless wide area network;
wherein the one or more report messages are among a sequence of a plurality of report messages transmitted by the computing system over time; and
wherein the sequence of the plurality of report messages corresponds to a sequence of time-series measurements output by the one or more sensors located on-board the vehicle over time.

18. The method of claim 1, wherein processing the input sensor data to obtain the characterization value and/or wherein transmitting the characterization value in the one or more reporting messages is performed responsive to a corresponding timing profile for that characterization parameter;
wherein the timing profile defines one or more state changes in the one or more time-series measurements of the measurement type to be satisfied for the characterization value of the characterization parameter to be included in the one or more reporting messages;
wherein the state changes defined by the timing profile including one or more of a level, a leading edge, a trailing edge, a high level, and/or a low level of the one or more time-series measurements.

19. A computing device located on-board a vehicle and physically interfacing with an on-board vehicle control system of the vehicle via a wired communications link, the computing device comprising:
a vehicle interface to interface with the vehicle control system via the wired communications link;
a communications subsystem to communicate over a wireless wide area nework;
a logic subsystem to execute instructions;
a storage subsystem having instructions stored thereon executable by the logic subsystem to:
receive input sensor data representing one or more time-series measurements output by one or more sensors located on-board the vehicle;
classify the one or more time-series measurements into a measurement type of a plurality of supported measurement types;
process the input sensor data to obtain a downsampled representation of the one or more time-series measurements, the downsampled representation having a downsampled sampling rate selected based on the measurement type;
identify one or more characterization parameters based on the measurement type to be reported as supplemental information along with the downsampled representation by referencing a database defining an association between a plurality of supported characterization parameters and the plurality of supported measurement types;
process the input sensor data to obtain a characterization value for each characterization parameter identified;

format the one or more characterization values to be reported along with the downsampled representation into one or more report messages; and transmit the one or more report messages over the wireless wide area network directed to a server system, the one or more characterization values for use by the server system as supplemental information in reconstructing the input sensor data from the downsampled representation.

20. A method for a server system including one or more server devices, the method comprising:

receiving one or more report messages transmitted over a wireless wide area network by a computing system located on-board a vehicle, the one or more report messages including a downsampled representation of input sensor data that was output by one or more sensors located on-board the vehicle, the one or more report messages further including one or more data characterization values obtained by the computing system located on-board the vehicle from the input sensor data;

processing the one or more report messages to obtain reconstructed input sensor data based on the downsampled representation using the one or more data characterization values;

identifying one or more qualitative linguistic values based on the reconstructed input sensor data by referencing a database of supported qualitative linguistic values having associated conditions to which the reconstructed input sensor data is compared;

storing the one or more qualitative linguistic values and/or the reconstructed input sensor data as profile information in a profile associated with an identifier included in the one or more report messages;

receiving a request to access the profile information from a client device over a wide area network;

authenticating the client device for the profile information requested by the client device; and transmitting the profile information requested by the client device over the wide area network following authentication of the client device.

* * * * *